United States Patent [19]
Jennen

[11] Patent Number: 5,531,282
[45] Date of Patent: Jul. 2, 1996

[54] ENDLESS TRACK MECHANISM

[75] Inventor: Wolfgang Jennen, Guetersloh, Germany

[73] Assignee: Claas Ohg, Harsewinkel, Germany

[21] Appl. No.: 319,967

[22] Filed: Oct. 7, 1994

[30] Foreign Application Priority Data

Oct. 14, 1993 [DE] Germany ............... 43 35 657.5

[51] Int. Cl.$^6$ ................................................. B62D 55/12
[52] U.S. Cl. ................................................. 180/9.1; 180/6.7
[58] Field of Search ............................. 180/9.1, 9.26, 180/9.28, 9.62, 6.2, 6.62, 6.64, 6.66, 6.7

[56] References Cited

U.S. PATENT DOCUMENTS

| | | | |
|---|---|---|---|
| 1,305,505 | 6/1919 | Townsend | 180/6.64 |
| 2,406,230 | 8/1946 | Lill | 180/9.62 |
| 3,529,687 | 9/1970 | Pensa | 180/6.7 X |
| 4,744,431 | 5/1988 | Stollinger | 180/9.5 |
| 4,893,883 | 1/1990 | Satzler | 180/9.1 X |
| 4,986,377 | 1/1991 | Moriarty | 180/6.7 X |

FOREIGN PATENT DOCUMENTS

| | | |
|---|---|---|
| 2161154 | 6/1973 | Germany . |
| 1630930 | 10/1974 | Germany . |
| 2539019 | 5/1984 | Germany . |
| 3410358 | 9/1985 | Germany . |
| 765090 | 9/1980 | U.S.S.R. . |
| 882810 | 11/1981 | U.S.S.R. . |
| 130630 | 8/1919 | United Kingdom .......... 180/6.7 |

*Primary Examiner*—Kevin T. Hurley
*Attorney, Agent, or Firm*—Michael J. Striker

[57] ABSTRACT

An endless track mechanism for vehicles and self-propelling machines having a front axle and a rear axle fixedly connected with a machine frame, the endless track mechanism comprising a plurality of endless track supports, a endless track supported by the endless track supports and having a drive wheel, an end transmission mounted at a rear end of the endless track supports for driving the drive wheel of the endless track, wherein each of the endless track supports has a closed hollow profile provided with mounting and service openings and non-rotatably articulated in the region of its front end portion with the front axle, and also through the end transmission which is mounted on an opposite end with the rear axle, an input transmission connected at a drive side with a machine drive, the input transmission and the hollow shaft which transmits a drive movement being arranged in the hollow profile of each of the endless track supports, bearings each provided in the input transmission and the end transmission, the hollow shaft being supported at an end side in the bearings.

8 Claims, 2 Drawing Sheets

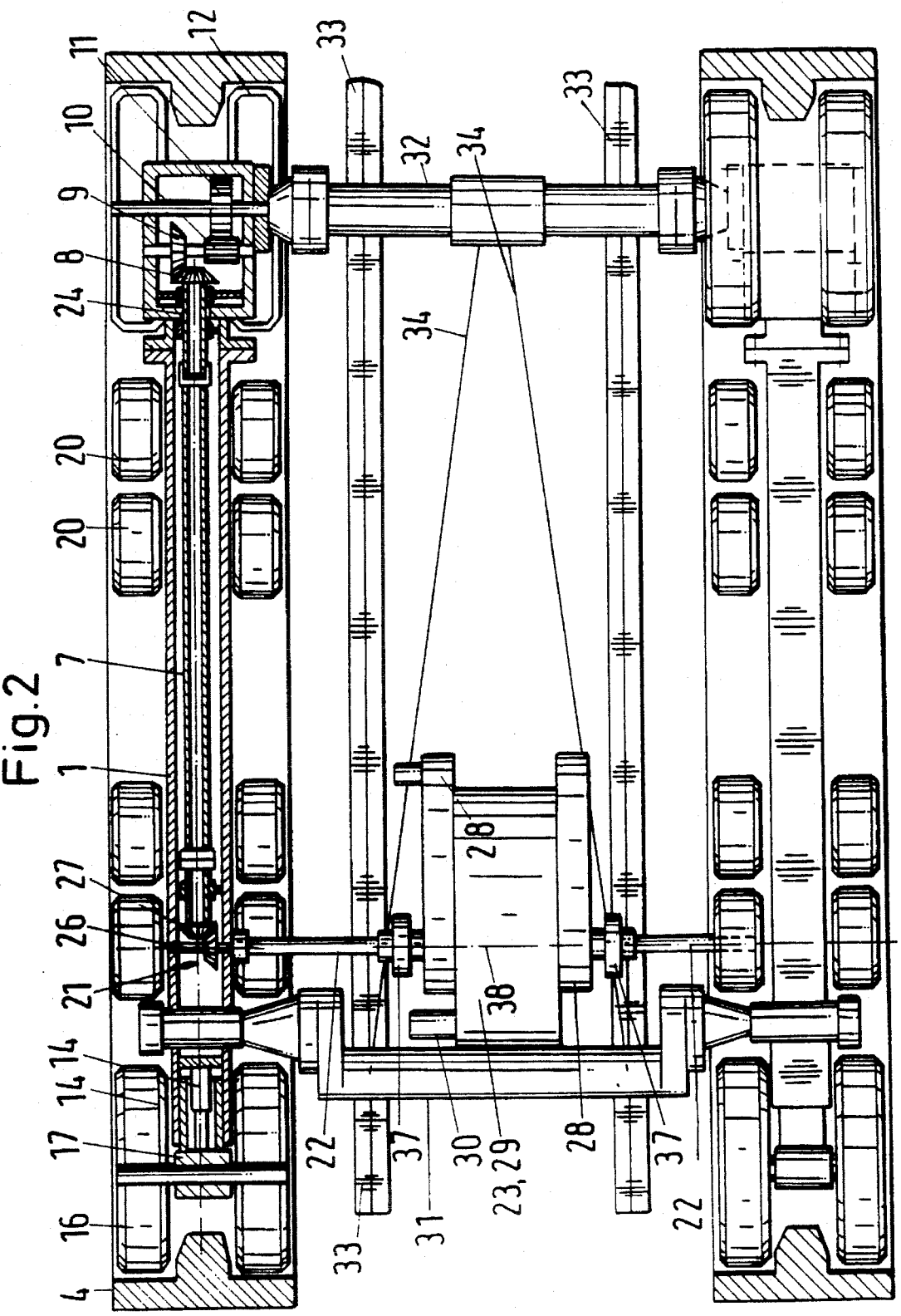

ENDLESS TRACK MECHANISM

BACKGROUND OF THE INVENTION

The present invention relates to an endless track mechanism for vehicles and self-propelling machines, for example for agricultural harvesting machines which are used under heavy ground conditions, for example on low load supporting grounds.

Endless mechanisms have the advantage over the substantially cost-favorable wheel mechanism, in that with good ground placement they cause low ground pressure and their use does not require planed or strengthened traveling floor. Endless track mechanisms are primarily used where high mass weights of heavy vehicles or machines must be transferred to low load supporting grounds, or a good and uniform ground adherence is required for example for overcoming a hilly or mountainous terrain. Vehicles and machines which can be used in these outside conditions are provided in accordance with their concept with a separate endless track mechanism adjusted to their constructions.

The known endless track mechanisms of the above mentioned general type usually have a torsion resistant central supporting frame fixedly connected with the frame of the machine or vehicle and supporting roller pairs articulated on its lower side and turnable in their holders. Supporting rollers which are supported in consoles are arranged on the upper side of the supporting frame. Such constructions are disclosed in U.S. Pat. No. 4,744,431 and in Soviet Union Patents 882,810 and 765,090. The front end of the supporting frame is provided with a deviating wheel for the endless track which is often identified as a deviating loop and in various known arrangements for an endless track mechanism is received by a device for adjusting and changing the endless track tension as disclosed in German documents DE 3 410 358 A1 and DE 2 539 019 C2. At the opposite side of the supporting frame, the drive wheel for the endless track is located which is identified as a drive loop which in some cases is connected with the machine or vehicle drive with interposition of a chain transmission or via hinge and Cardan shafts directly. Also, other solutions are known in which the rear end of each supporting frame and end transmission for the drive of each drive wheel is mounted and is driven separately for each drive wheel from a hydraulic motor or an electric motor or rotatably connected with the machine or vehicle drive by hinge or Cardan shaft. These solutions are disclosed in the German document DE 2 505 040 A1 and DE-AS 1 630 930.

German document DE-OS 2 161 154 discloses an endless track mechanism for a tractor which at the front side receiving working tool, wherein the running mechanism supporting arm is provided with longitudinal-thrust loadable thrust force-transmitting rod. This thrust force-transmitting rod which operates simultaneously as a supporting pipe forms a structural unit with the supporting frame and extends from the rear end of the mechanism frame, on which the drive wheel of the endless driving chain is supported to a front central tractor portion. Inside the thrust force-transmitting rod, a hinge shaft which transmits the drive torque to the drive wheel is provided. The endless track mechanism proposed in the German document DE-OS 2 161 154 is formed so that it directly takes up and transfers high thrust and pulling forces which occur in operation. Simultaneously, forces which are applied laterally to the working tool and located downwardly are absorbed better, whereby the total stability of the frame construction and the endless track vehicle is increased. The thrust force-transmitting rods which are articulately connected on the mechanism frame to a structural unit lead however to a cost unfavorable multiple loading and moreover requires additional space which often is not available.

In connection with this it must be further mentioned that the hollow supports with inwardly located chain or wheel drives are also known as well as hydraulic hoses guided in the hollow supports.

SUMMARY OF THE INVENTION

Accordingly, it is an object of the present invention to provide an endless track mechanism of the above mentioned general type, which is formed so that without great additional manufacturing and mounting expenses it can be used on a working device or vehicle for a wheel mechanism, and in addition it transmits maximum high rotary speeds from a given machine to the end transmission of the drive wheels for the endless an endless track.

In keeping with these objects and with others which will become apparent hereinafter, one feature of the present invention resides, briefly stated, in an endless track mechanism for vehicles and self-propelling machines in accordance with which each endless track support is non-rotatably articulated with a closed hollow profile having mounting and service openings in the region of its front end portion on a front axle and through an end transmission connected to the opposite end on a rear axle which are correspondingly connected with the machine frame, and in the hollow profile of each endless track support an input transmission is arranged which at the driving side is connected with the machine drive and also a hollow shaft which transmits the drive movement is arranged, wherein the hollow shaft at the end side is supported in the bearings which are provided in the input and end transmissions.

In accordance with another feature of the present invention an input transmission is rotatably connected through a hinge shaft with the machine drive.

Still another feature of the present invention is that the input transmission is composed of a bevel wheel set and the machine drive has a combined transmission composed of a switching transmission and two steering differential transmissions arranged in separate transmission housings with service and parking brakes arranged on the drive shaft, on which the hinge shaft is mounted.

Still another feature of the present invention is that the end transmission is composed of a bevel wheel set and a spur wheel pair, wherein the bevel wheel and the spur wheel are arranged on an intermediate shaft whose axial distance to the bearing of the hollow shaft is exactly fixed, and the spur wheel is mounted on an axle which supports a drive wheel pair and has a position changeable to the intermediate shaft.

Finally, the whole shaft has a connecting flange arranged at the end side, on which with the counter flange bearing pins can be non-rotatably mounted which are received by the bearings in the input and end transmissions.

The endless track support which is formed as a closed, box-shaped hollow profile and is provided with lateral mounting and service openings is fixedly connected in the region of its front end portion with the front axle mounted on the machine or vehicle frame and through the housing mounted on the rear end on the endless track support for an end transmission with a rear axle which is also mounted on the machine or vehicle frame. Stabilizers in V-shape arrangement are mounted between the front and rear axles and provide in a known manner the rigidification of the whole traveling mechanism. Similarly, in its front region an input transmission composed of a bevel wheel set is located in its front region in each endless track support and non-rotatably connected through a hinge shaft with the machine drive. The rotary movement of the machine drive is transmitted through the input transmission and a shaft extending inside the hollow profile of the caterpillar track support to the end transmission. The end transmission at the end side is supported in a corresponding bearing of the input and output transmission. For transmitting maximum high rotary speeds in order to obtain a great drive torque at the drive wheels, the endless endless track is formed as a hollow shaft. Due to the drive connection from the machine drive to the drive wheels for the endless endless track, both a relative displacement of the arrangement of the left and right mechanisms relative to the machine drive, as well as an individual adjustment of the arrangement of the machine drive to the left and right mechanisms are provided. The proposed endless track mechanism is therefore useable universally.

The endless chain is preferably a rubber conveyor band which is guided through a deviating wheel pair and a drive wheel pair arranged on a same axis. The width of the running rollers mounted articulately on the caterpillar track support is dimensioned so that the running rollers extend to the edge zone of the rubber band. Therefore, in addition to a good ground placement, a maximum uniform loading of the rubber mechanism is obtained.

The structural design of the proposed endless track mechanism requires a relatively small mounting space and can be used without great additional manufacturing and mounting expenses instead of the wheel running mechanism of a vehicle or a self-propelling working machine. The vehicles and self-propelling working machines originally were proposed with a wheel mechanism can be converted with the above proposed solutions in cost-favorable manner to an endless track mechanism in a relatively fast and simple manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a plan view of the inventive endless track mechanism.

DESCRIPTION OF THE PREFERRED EMBODIMENTS

Figure 1:
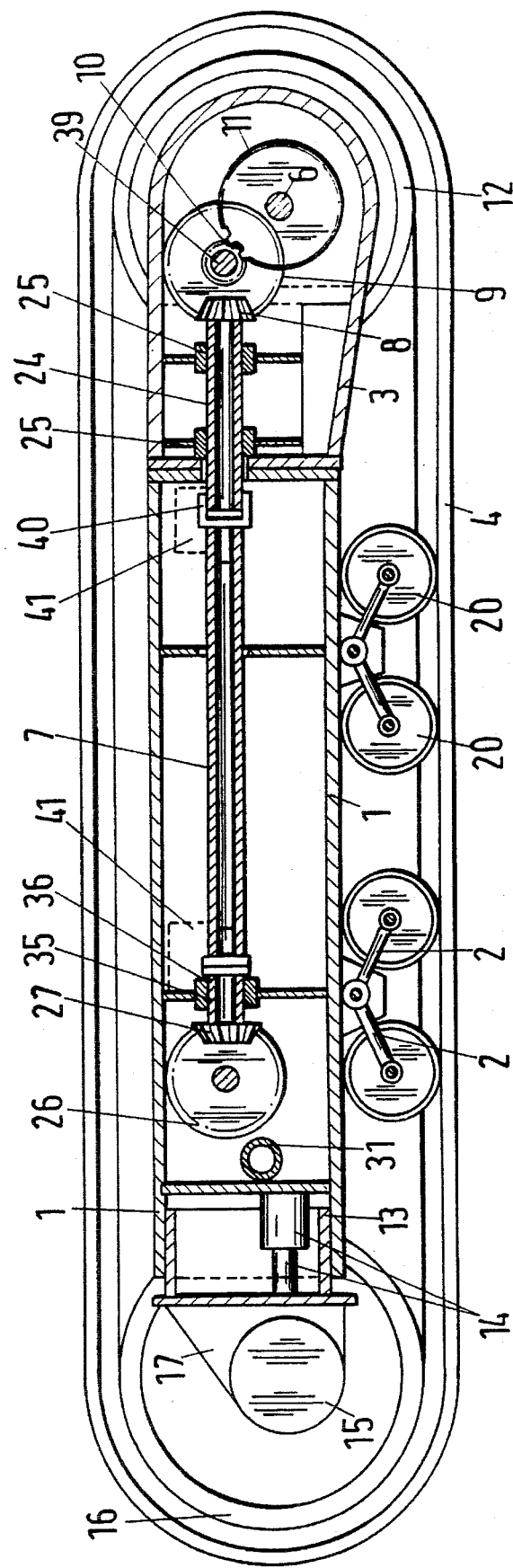
FIG. 1 is a side view of a schematically shown endless track mechanism in a partial section.

FIG. 2 shows an example of a traveling mechanism of a self-propelling agricultural machine including left and right endless track mechanism which have a central endless track support 1. The support 1 is non-rotatably articulated in the region of its front end portion on a front axle 31 fixedly connected with the machine frame 33. It is also fixedly connected through the housing of an end transmission 3 mounted on the opposite end of the central endless track support 1 with a rear axle 32 which is also fixedly connected with the machine frame 34. Stabilizers 33 which form a V-shaped arrangement are releasably mounted between the front axle 31 and the rear axle 32. Together with the machine frame 33 they further improve the stability of the endless track mechanism. Therefore the thrust and pulling forces occurring transverse to the longitudinal axis of the traveling mechanism are reliably taken up and transferred to the machine frame 33 and the traveling mechanism.

The central endless track support 1 of each endless track mechanism has a closed, box-shaped hollow profile provided with lateral mounting and service openings 41. A track tensioning device 17 is provided at the front end of the central endless track support 1. A rotary axle 15 of a deviating wheel pair 16 for an endless track 4 in the present embodiment a rubber band, is fixedly arranged on the device 17. The track tensioning device 17 includes a telescopable profiled support 13 arranged in the central endless track support 1 and a hydraulic working cylinder piston unit 14. The cylinder piston unit changes the position of the profiled support 13 so as to provide the desired tensioning of the endless track 4 or as in the shown embodiment to adjust the tension of the rubber band and change it when needed.

An input transmission 21 is inserted in the region of front end portion in each central endless track support 1 of the left and right mechanisms. The input transmission 21 is composed of bevel wheels 26 and 27. The transmission 21 is connected through hinge shafts 22 with a drive shaft 38 of a combined transmission 23 on which further service and parking brakes 37 are arranged. This transmission 23 is formed of a switching transmission 29 driven by a hydraulic motor 30 and left and right steering differential transmissions 28 which are kinematically coupled with the switching transmission 22 and in turn are in operative connection with a hydraulic motor of the steering device of the self-propelling machine.

For transmitting the drive rotary movement from the machine drive through the input transmission 21 and the end transmission 3 mounted at the rear end of each central track support 1 to the drive wheels 12 which are also formed as a wheel pair, a Cardan shaft. The Cardan shaft is formed for example as a hollow shaft 7 with end connecting flanges 40. Bearing pins 24, 35 are releasably mounted on the hollow shaft 7 with a corresponding counter flange and supported in bearings 25, 36 which are located in the transmission housing of the input transmission 21 and the end transmission 3. The design of the Cardan shaft as the hollow shaft 7 and the bearing of the shaft guarantees, in addition to a maintenance free arrangement and a cost-favorable manufacture and mounting also the transmission of relatively high drive rotary speeds, whereby high torques can be provided at the drive wheel pair 12.

The rotary movement transmitted from the machine drive 23 through the input transmission 21 of the hollow shaft 7 is supplied first in the end transmission 3 to a bevel wheel pair 8, 9. The bevel wheel 9 together with a spur wheel 10 is arranged on an intermediate shaft 39 which is spaced from the axle 6 of the drive wheel pair 12. The rotary movement is further transmitted through the spur wheel 10 and the spur wheel 11 to the axle 6 which is rotatably connected with the drive wheel pair 12. This arrangement is designed so that on the one hand the conditions for an exact bearing of the hollow shaft 7 are provided by the exactly fixed axial distance between the bevel wheel 8 mounted on the bearing pin 24 and the bevel wheel 9 located on the intermediate shaft 39, and on the other hand eventual manufacturing tolerances can be compensated by position change of the axle 15 relative to the intermediate shaft 39.

Several rollers 20 rotatably supported on a swinging supports 2 are located at the lower side of the endless track support 1. The swinging supports 2 are turnably arranged in consoles which are fixedly connected with the endless track support 1. The width of the rollers 20 is selected so that they extend to the rubber band in the edge region. Therefore a uniform ground placement and a uniform loading of the band is provided.

It will be understood that each of the elements described above, or two or more together, may also find a useful application in other types of constructions differing from the types described above.

While the invention has been illustrated and described as embodied in an endless track mechanism, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A vehicle, comprising a front axle and a rear axle; a machine drive; and an endless track mechanism comprising a plurality of endless track supports, an endless track supported by said endless track supports and having a drive wheel, an end transmission mounted at a rear end of said endless track supports for driving said drive wheel of said endless track, wherein each of said endless track supports has a closed hollow profile provided with mounting and service openings and non-rotatably connected in the region of its front end portion with the front axle, and also through said end transmission which is mounted on an opposite end with the rear axle, an input transmission connected at a drive side with said machine drive, said input transmission and said hollow shaft which transmits a drive movement being arranged in said hollow profile of each of said endless track supports, and bearings each provided in said input transmission and said end transmission, said hollow shaft being supported at an end side in said bearings, said input transmission including a bevel wheel set and a combined transmission; and a combined transmission including a switching transmission and two steering differential transmissions arranged in separate transmission housing and provided with service and parking brakes arranged on a drive shaft, said hinged shaft being mounted on said combined transmission.

2. A vehicle, comprising a front axle and a rear axle; a machine drive; and an endless track mechanism comprising a plurality of endless track supports, an endless track supported by said endless track supports and having a drive wheel, an end transmission mounted at a rear end of said endless track supports for driving said drive wheel of said endless track, wherein each of said endless track supports has a closed hollow profile provided with mounting and service openings and non-rotatably connected in the region of its front end portion with the front axle, and also through said end transmission which is mounted on an opposite end with the rear axle, an input transmission connected at a drive side with said machine drive, said input transmission and said hollow shaft which transmits a drive movement being arranged in said hollow profile of each of said endless track supports, and bearings each provided in said input transmission and said end transmission, said hollow shaft being supported at an end side in said bearings, said end transmission having a bevel wheel set having two bevel wheels and a spur wheel pair having two spur wheels, an intermediate shaft on which one of said bevel wheels and one of said end wheels are arranged and which is spaced from one of said bearings of said hollow shaft, and an axle which supports a drive wheel pair and on which another of said spur wheels is mounted, said axle having a position which is changeable relative to said intermediate shaft.

3. A vehicle, comprising a front axle and a rear axle; a machine drive; and an endless track mechanism comprising a plurality of endless track supports, an endless track supported by said endless track supports and having a drive wheel, an end transmission mounted at a rear end of said endless track supports for driving said drive wheel of said endless track, wherein each of said endless track supports has a closed hollow profile provided with mounting and service openings and non-rotatably connected in the region of its front end portion with the front axle, and also through said end transmission which is mounted on an opposite end with the rear axle, an input transmission connected at a drive side with said machine drive, said input transmission and said hollow shaft which transmits a drive movement being arranged in said hollow profile of each of said endless track supports, and bearings each provided in said input transmission and said end transmission, said hollow shaft being supported at an end side in said bearings, a plurality of stabilizers located in a V-shaped arrangement between the front axle and the rear axle, and additional axles on which said stabilizers are releasably mounted.

4. A vehicle as defined in claim 11; and further comprising rollers which are provided for said endless track, and at least one swinging support which is turnably supported about a horizontal axis and articulately connected in a longitudinal axis of said endless track support for rotatably supporting said rollers, said endless track being formed as a rubber band, said rollers having a width which is selected so that they extend up to an edge zone of said rubber band.

5. A vehicle as defined in claim 4, wherein said endless track mechanism further comprising a deviating wheel for said endless track; and a track tensioning device provided at the front end of each of said endless track supports and receiving said deviating wheel.

6. A vehicle as defined in claim 4, wherein said endless track mechanism further comprising a hinged shaft through which said input transmission is rotatably connectable with the machine drive.

7. A vehicle as defined in claim 4, wherein said endless track mechanism further comprising a mounting flange arranged at an end side of said hollow shaft and a counter flange non-rotatably mounted on said connecting flange and supporting bearing pins which are received by said bearings in said input transmission and said end transmission.

8. A vehicle as defined in claim 4, wherein said endless track mechanism further comprising a deviating wheel and a drive wheel provided for said endless track and formed as a wheel pair; and a common axle on which said wheel pair is arranged.

* * * * *